J. F. BOONE.
TRACTION ENGINE.
APPLICATION FILED DEC. 9, 1910.

1,027,311.

Patented May 21, 1912.
2 SHEETS—SHEET 1.

Witnesses
F. A. Bullington
E. B. Birkenbeuel

Inventor
John F. Boone
by Sturtevant & Mason
Attorneys.

J. F. BOONE.
TRACTION ENGINE.
APPLICATION FILED DEC. 9, 1910.

1,027,311.

Patented May 21, 1912.
2 SHEETS—SHEET 2.

Witnesses
F. A. Bullington
C. B. Birkenbeuel

Inventor
John F. Boone
by Sturtevant & Mason
Attorney

UNITED STATES PATENT OFFICE.

JOHN F. BOONE, OF PORTLAND, OREGON.

TRACTION-ENGINE.

1,027,311.  Specification of Letters Patent.  Patented May 21, 1912.

Application filed December 9, 1910. Serial No. 596,450.

*To all whom it may concern:*

Be it known that I, JOHN F. BOONE, a citizen of the United States, residing at Portland, in the county of Multnomah, State of Oregon, have invented certain new and useful Improvements in Traction-Engines, of which the following is a description, reference being had to the accompanying drawing and to the letters and figures of reference marked thereon.

The invention relates to new and useful improvements in traction engines, and more especially to traction engines wherein both the forward and rear trucks are connected to the main frame so that they may be turned relative thereto.

An object of the invention is to provide mechanism for connecting and supporting the trucks whereby the same may be turned simultaneously by the aid of a single steering wheel.

A further object of the invention is to provide a driving connection with a motor operating shaft carried by the main frame and the trucks which connection will allow the free swinging of the truck about a pivotal connection with the main frame.

These and other objects will in part be obvious and will in part be hereinafter more fully described.

Figure 2:
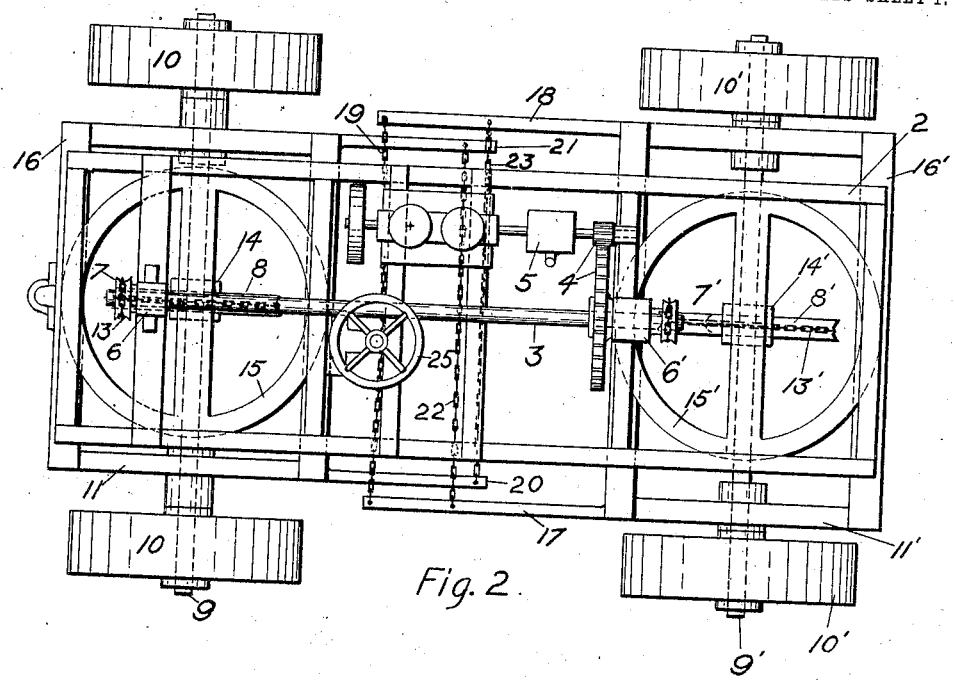
Figure 1:
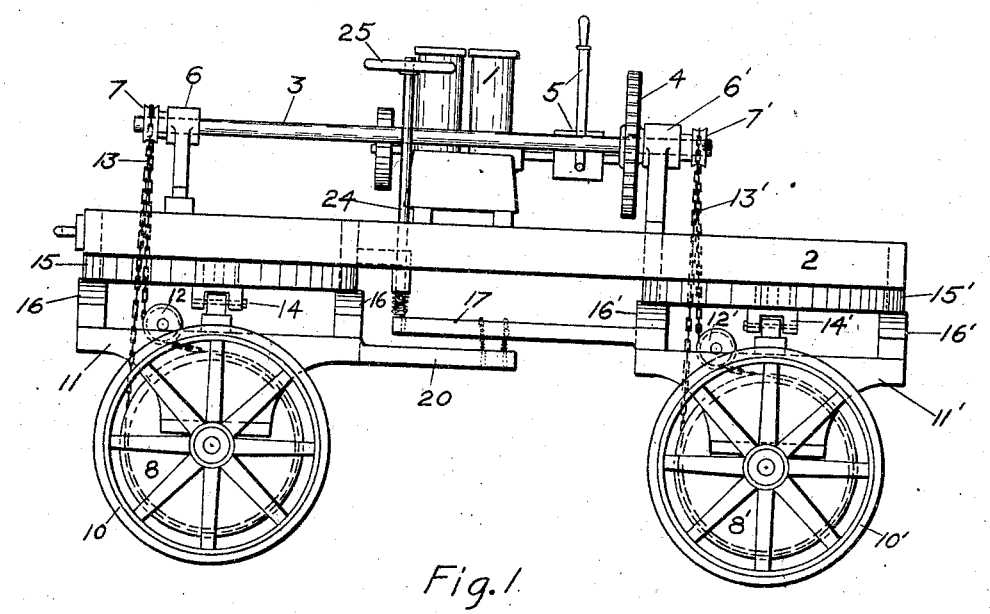
Figure 4:
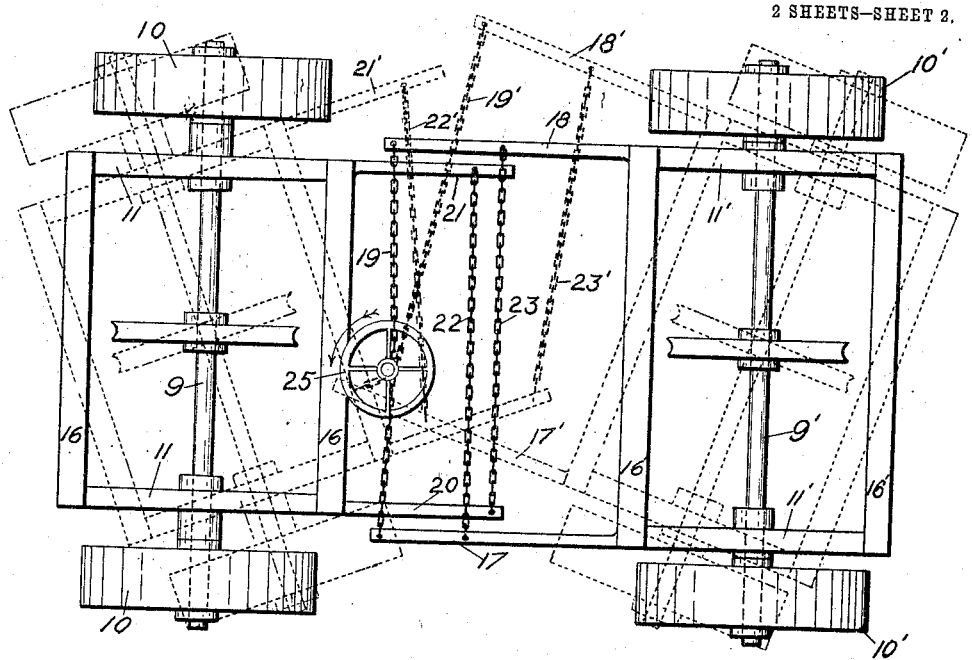
Figure 3:
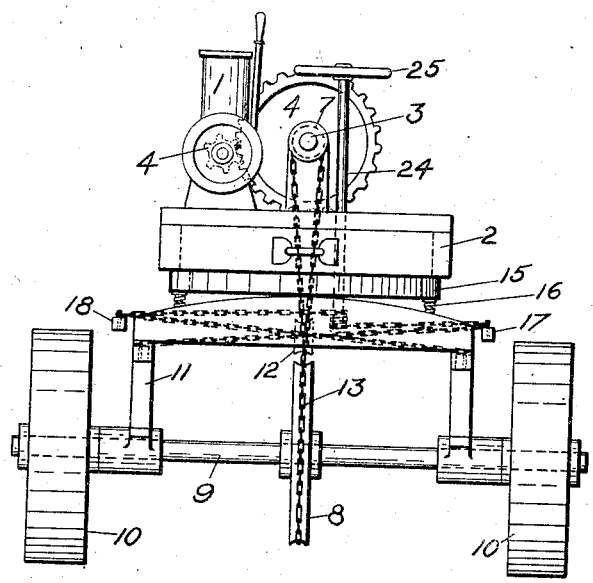

In the drawings which show by way of illustration one embodiment of the invention; Figure 1 is a side elevation of a traction engine embodying my improvements; Fig. 2 is a plan view of the same; Fig. 3 is a rear end view of the traction engine; Fig. 4 is a detail plan view showing both trucks and the steering gear and in dotted lines showing the trucks swung relative to the main frame, for changing the direction of movement of the engine.

My improved engine consists of a main frame 2, which is supported on traction wheels 10, 10, at the rear and 10', 10', at the front of the frame. The wheels 10, 10, are rigidly connected with the axle 9, which in turn is journaled in any suitable way, in the truck frame 11. The truck frame 11 is connected to the main frame 2 by a connection 14, which allows the truck to swing about a vertical axis extending through said connection and also allows the main frame to rock about said connection in a direction transversely of said frame. The truck frame 11 is also provided with curved bolsters 16, 16, on which the circular members 15, attached to the main body portion 2, rest. The forward wheels 10', 10', are rigidly connected to an axle 9', which in turn is journaled in a truck frame 11'. The truck frame 11' is provided with bolsters 16', 16', on which the circular member 15' rests. The pivoted connection 14' between the truck frame 11' and the main frame 2 is similar in all respects to the connection 14 above referred to. These connections between the truck frames and the main frame or body portion 2, allows each of the trucks to be turned relative to the body portion 2, and will allow the body portion 2 to rock transversely.

As a means for turning the truck relative to the main frame for steering the traction engine, I have provided a single steering wheel 25, which is rigidly attached to a steering post 24, mounted in any suitable way on the main frame 2 of the traction engine. The truck frame 11 is provided with forwardly extending arms 20 and 21, while the truck frame 11' carries rearwardly extending arms 17 and 18.

As clearly shown in Fig. 1, the arms 17 and 18 are arranged in a plane above the arms 20 and 21, and overlap the same. The arm 20 at its outer end is connected by a chain or other suitable flexible connection 23, with the arm 18 at a point some distance from its outer end, while the arm 21, at a point adjacent its outer end, is connected with a chain or other flexible connection 22, which in turn is connected to the arm 17 at a point some distance from its outer end. It will thus be seen, that if the frame 11 be swung in one direction about its pivotal connection with the main frame, the chain 22 will cause the frame 11' to be swung in an opposite direction about its pivotal connection with the main frame, and the arms 21 and 17 will swing in the same direction relative to the side of the main frame. The arm 21 will now take the position shown in dotted lines at 21' and the chain or flexible connection 22 will take the position shown in dotted lines at 22', while the arm 18 will swing to the position shown in dotted lines at 18' and the chain 23 will take the position shown in dotted lines at 23'. When the frames are positioned as shown in dotted lines above referred to, the traction wheels 10, 10, and 10', 10', will also take the position shown in dotted lines in Fig. 4, and the wheels are now positioned so as to change the direction of movement of the traction engine.

This means for shifting the position of the trucks is preferably so porportioned that the wheels 10, 10, will follow the path of movement of the wheels 10'. This is accomplished of course, by the equal swinging of the trucks.

In order to swing the trucks from the steering post, I have provided a chain or other flexible connection 19 which is attached to the outer ends of the arms 17 and 18 and is wrapped several turns about the steering post. When the steering post is turned by manipulating the steering wheel 25, the chain 19 will be wound on to and unwound from the steering post and will take the position shown in dotted lines at 19'. The turning of the steering wheel in the opposite direction will swing the supporting frames for the trucks back to normal position or to the other side of the center line of the traction engine and position said trucks for straight ahead movement or for turning in the opposite direction.

As a means for driving the traction engine, I have provided as herein shown, a gasolene engine 1, which is mounted on the main frame or body 2 of the engine, and connected to the driving shaft 3 by suitable gears 4. A reverse gear 5 of the usual construction may be used for furnishing means so that the traction engine may be propelled either in a forward or backward direction. The driving shaft 3 is mounted in suitable brackets 6, 6', and carries at its outer end sheaves 7, 7', which are rigidly mounted thereon. Mounted centrally of the axle 9 is a sheave 8 which is rigidly connected to the axle. A driving chain 13 extends over the sheave 7 and over the sheave 8. A guiding sheave 12 is mounted on the frame 11 and directs the path of movement of the driving chain 13, so that it extends in substantially a vertical direction from the sheave 7 to the sheave 8. The sheave 7 as herein shown, is mounted so as to turn about an axis at right angles to the axis of the sheave 8 when the truck 11 is in position for straight ahead movement of the traction engine. The sheave 7' is connected by a suitable chain 13', with a sheave 8' on the axle 9'.

A guiding sheave 12' connected to the frame 11', guides the chain 13' so that it extends in substantially a vertical direction in a manner similar to the chain drive 13. This vertical connection between the driving shaft and the sheaves on the axles of the trucks, allows the trucks to be swung about their pivotal connections with the main frame, without interferring or straining in any way, the vertical driving connection.

It is obvious that minor changes in the details of construction and arrangement of parts may be made, without departing from the spirit of my invention as set forth in the appended claims.

Having thus particularly described my invention, what I claim as new and desire to secure by Letters Patent, is:—

1. A traction engine including in combination, a main frame, a truck support pivoted at the end of said main frame, an axle journaled in said truck support, traction wheels carried by the axle, a driving shaft extending longitudinally of the main frame, and carried thereby, a motor operatively connected with said driving shaft, a sheave located on the end of the shaft adjacent the truck, a sheave mounted centrally on the axle, flexible driving means for connecting the sheave at the end of the shaft with the sheave on the axle, and a guiding sheave carried by the truck frame for engaging and directing the path of movement of the flexible driving means.

2. A traction engine including in combination, a main frame, a truck pivoted at each end of said main frame, an axle journaled in each truck frame, traction wheels carried by said axles, a driving shaft extending longitudinally of said main frame, and carried thereby, a motor operatively connected with said driving shaft, a sheave located at each end of the driving shaft, a sheave mounted centrally on each axle, a driving chain for connecting each of the sheaves at the end of the shaft with the sheaves on each axle, and a guiding sheave carried by each truck frame for engaging and directing the path of movement of the driving chain for the traction wheels on each truck frame.

3. A traction engine including in combination, a main frame, a truck pivoted at each end of said frame, an axle journaled in each truck frame, traction wheels carried by said axles, a driving shaft, extending longitudinally of said frame and carried thereby, a motor operatively connected with said driving shaft, a sheave mounted centrally of each axle, a driving chain for connecting each of the sheaves of the ends of the shaft with the sheaves on each axle, and a guiding sheave carried by each truck frame, for engaging and directing the path of movement of the driving chain for the traction wheels of each truck frame, and means for simultaneously turning the trucks about their pivotal connections to the main frame in opposite directions for steering the engine.

In testimony whereof I have affixed my signature, in presence of two witnesses.

JOHN F. BOONE. [L. S.]

Witnesses:
FRANK A. BULLINGTON,
LYDIA A. MAY.